(12) United States Patent
Shi et al.

(10) Patent No.: US 6,969,230 B2
(45) Date of Patent: Nov. 29, 2005

(54) VENTURI OUTLET TURBINE AIRFOIL

(75) Inventors: Baolan Shi, Swampscott, MA (US); Robert Francis Manning, Newburyport, MA (US); Randall Brent Rydbeck, Hamilton, MA (US)

(73) Assignee: General Electric Company, Schenectady, NY (US)

(*) Notice: Subject to any disclaimer, the term of this patent is extended or adjusted under 35 U.S.C. 154(b) by 36 days.

(21) Appl. No.: 10/320,971

(22) Filed: Dec. 17, 2002

(65) Prior Publication Data

US 2004/0115053 A1 Jun. 17, 2004

(51) Int. Cl.⁷ .............................................. F04D 29/38
(52) U.S. Cl. ..................................... 415/115; 416/97 R
(58) Field of Search ...................... 416/97 R; 415/115, 415/116

(56) References Cited

U.S. PATENT DOCUMENTS

| 3,533,711 | A | 10/1970 | Kercher |
| 4,197,443 | A | 4/1980 | Sidenstick |
| 4,303,374 | A | 12/1981 | Braddy |
| 4,500,258 | A | 2/1985 | Dodd et al. |
| 4,601,638 | A | 7/1986 | Hill et al. |
| 4,676,719 | A | 6/1987 | Auxier et al. |
| 5,246,341 | A | 9/1993 | Hall et al. |
| 5,368,441 | A | 11/1994 | Sylvestro et al. |
| 5,462,405 | A | 10/1995 | Hoff et al. |
| 6,132,169 | A | 10/2000 | Manning et al. |
| 6,602,047 | B1 | * 8/2003 | Barreto et al. .................. 415/1 |

OTHER PUBLICATIONS

U.S. Appl. No. 10/039,719; filed Jan. 4, 2002; R.F. Manning et al.

* cited by examiner

Primary Examiner—Edward K. Look
Assistant Examiner—Dwayne J. White
(74) Attorney, Agent, or Firm—William S. Andes; Francis L. Conte

(57) ABSTRACT

A turbine airfoil includes sidewalls extending between leading and trailing edges, with an internal cooling circuit therein. A row of venturi slots commences inside the airfoil at the cooling circuit and terminates near the trailing edge. Each of the venturi slots includes an inlet, converging portion, throat, diverging portion, and outlet in serial flow communication from the cooling circuit. The converging portion is comparable in chordal length with the throat.

20 Claims, 7 Drawing Sheets

VENTURI OUTLET TURBINE AIRFOIL

BACKGROUND OF THE INVENTION

The present invention relates generally to gas turbine engines, and, more specifically, to turbines therein.

In a gas turbine engine, air is pressurized in a compressor and mixed with fuel in a combustor for generating hot combustion gases which flow downstream through turbines that extract energy therefrom. High and low pressure turbines extract energy in turn for correspondingly powering the compressor and providing useful work, such as powering an upstream fan in an exemplary turbofan engine for powering an aircraft in flight.

In aircraft applications, engine weight and efficiency are primary design objectives for maximizing aircraft range and reducing operating costs. Weight and efficiency are interrelated in the various highly sophisticated components of the modern gas turbine engine built with precision typically measured in mils, and even fractions of mils.

Rotary turbine blades and stationary turbine nozzle vanes have corresponding airfoil profiles precisely configured for maximizing efficiency of energy extraction from the combustion gases. These components are heated by the hot combustion gases during operation, and therefore require suitable cooling for ensuring a long useful life.

Turbine airfoil cooling is conventionally effected by forming various cooling circuits therein which are fed from air bled from the compressor used as a coolant for protecting the airfoils during operation. Diverting compressed air from the combustor correspondingly decreases efficiency of the engine, and therefore it is desired to minimize the use of parasitic cooling air while suitably protecting the hot turbine components.

The prior art of turbine blades and nozzles is crowded with various forms of the cooling circuits therein and various forms of discharge cooling holes through the pressure and suction sidewalls of the airfoils.

Turbine airfoil discharge holes are found at various locations between the leading and trailing edges of the airfoil and from root to tip thereof, and have various sizes and configurations selected to improve performance in the complex three-dimensional combustion gas flow field surrounding the airfoils. And, the airfoils are subject to complex stress distribution at the different parts thereof due to the complex temperature distribution.

The cooling configurations of the turbine airfoils are also dependent on the physical size of the airfoils from large to small, with the smaller airfoils having additional problems for efficient cooling thereof due to the practical lower limit in size of cooling features which may be introduced therein.

In particular, the trailing edge of a turbine airfoil is relatively thin in view of the typical aerodynamic profile of the airfoil which has a maximum thickness near the leading edge, with the two sidewalls converging to the sharp trailing edge. The internal cooling circuit of the airfoil must correspondingly decrease in size to fit between the converging sidewalls of the airfoil, and typically must terminate before reaching the trailing edge for small airfoils, or airfoils having similarly thin trailing edges.

In order to adequately cool the airfoil trailing edge, the internal cooling circuit typically discharges into a row of trailing edge holes formed through the pressure side of the airfoil just upstream of the trailing edge. The discharged coolant provides a protective film of cooling air which travels downstream over the trailing edge for protection thereof from the hot combustion gases.

However, for particularly small turbine airfoils on the order of several centimeters in span height, the introduction of even the minimum-size outlet hole, on the order of about 10–15 mils in diameter, may require the placement of the trailing edge holes significantly upstream from the trailing edge itself, which decreases the cooling effectiveness of the discharged air.

Correspondingly, the minimum-size typical outlet holes may discharge more cooling air than required due to their relatively large size, and therefore decrease overall engine efficiency.

The ability to manufacture economically turbine airfoils is another significant objective in the design process. Turbine blades and vanes are typically cast using a ceramic core for the internal cooling features thereof in the conventional lost wax casting process.

Small features in the ceramic core correspondingly make the core fragile and subject to breaking during the manufacturing process which increases the overall cost of manufacture. Ceramic core yield is a significant factor in manufacturing turbine airfoils, and small cooling features embodied in the core are typically associated with lower yield.

For example, the trailing edge discharge holes are particularly problematic in manufacturing turbine airfoils since they correspondingly have small features which have practical lower-size limits in the casting of small turbine airfoils. The trailing edge holes have a finite axial or chordal length and are typically arranged in a radial row disposed in flow communication with a common radial flow passage inside the airfoil. The corresponding ceramic core has a common ceramic leg with a row of cantilevered ceramic fingers representing the trailing edge holes after casting.

For larger turbine airfoils, the ceramic core may be sufficiently strong for obtaining a sufficient yield for economically casting the airfoils. However, for small airfoils and small features the ceramic fingers would become unacceptably small and fragile leading to an unacceptable yield rendering their use in manufacture impractical.

Instead, the small airfoil may be cast with a corresponding ceramic core omitting the ceramic fingers and the trailing edge holes for casting the airfoil. The so-cast airfoil then undergoes a subsequent manufacturing operation for drilling the trailing edge holes, typically using electrical discharge machining (EDM) or electrostream (ES) machining for achieving the small size and tolerances required for the small trailing edge holes.

Accordingly, it is desired to provide a turbine airfoil having an improved trailing edge cooling design for increasing cooling efficiency in a configuration which may be manufactured using a corresponding ceramic core with suitable yield, even for typically small turbine airfoils.

BRIEF DESCRIPTION OF THE INVENTION

A turbine airfoil includes sidewalls extending between leading and trailing edges, with an internal cooling circuit therein. A row of venturi slots commences inside the airfoil at the cooling circuit and terminates near the trailing edge. Each of the venturi slots includes an inlet, converging portion, throat, diverging portion, and outlet in serial flow communication from the cooling circuit. The converging portion is comparable in chordal length with the throat.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
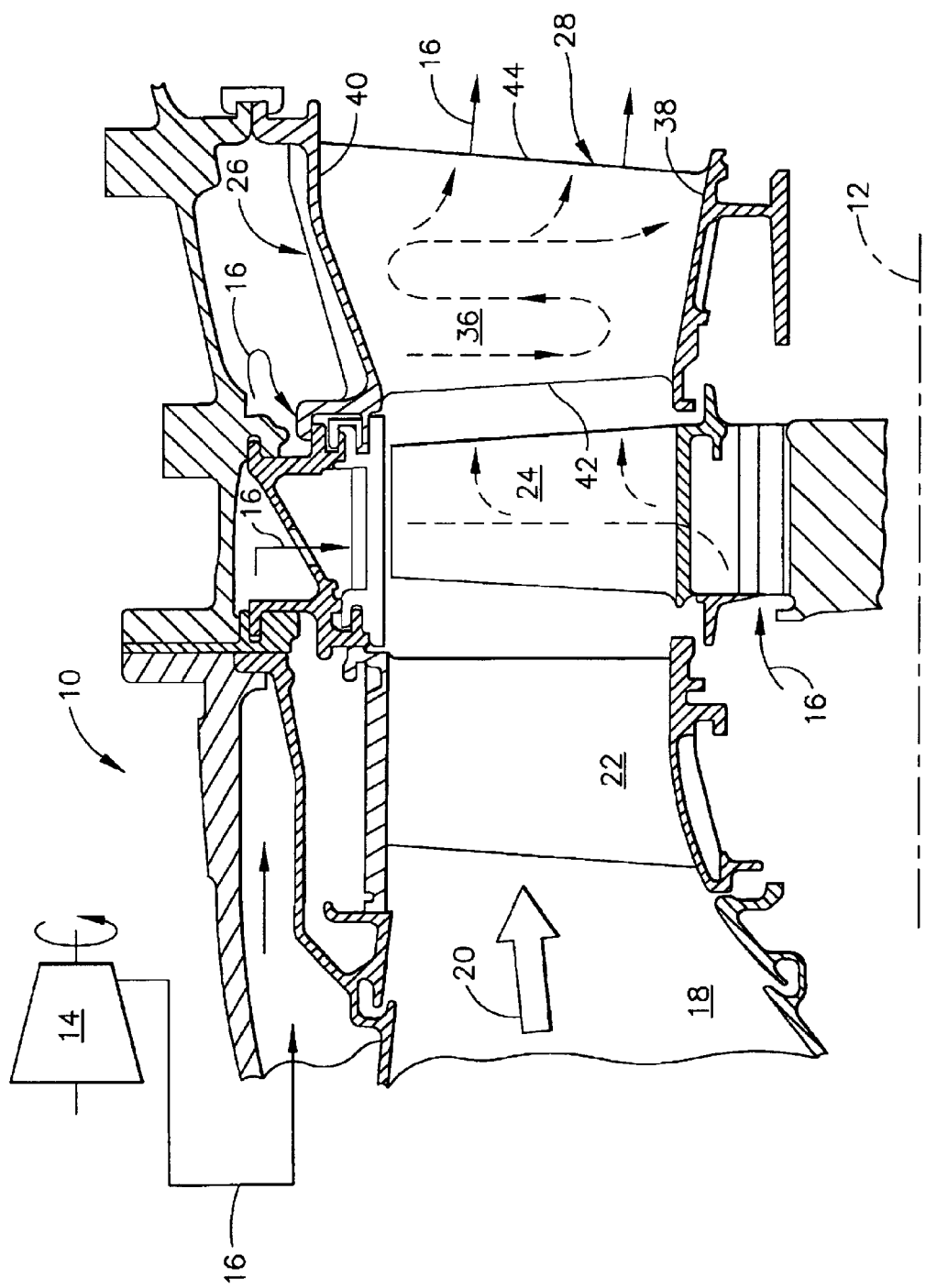
FIG. 1 is a partly sectional axial view of a portion of an aircraft gas turbine engine including a second stage turbine nozzle in accordance with an exemplary embodiment of the present invention.

Illustrated in FIG. 1 is a portion of an exemplary turbofan gas turbine engine 10 which is axisymmetrical about a longitudinal or axial centerline axis 12. The engine includes a multistage axial compressor 14 configured for pressurizing air 16 which is suitably channeled to an annular combustor 18, illustrated in aft part.

Fuel is mixed with the compressed air in the combustor in a conventional manner for generating hot combustion gases 20 which flow downstream therefrom.

A high pressure turbine includes a first stage turbine nozzle 22 which channels the combustion gases from the combustor through a row of first stage turbine rotor blades 24 which extract energy therefrom. The blades extend radially outwardly from a supporting disk which is joined by a shaft to the compressor for rotating the several stages of compressor rotor blades therein during operation.

Disposed immediately downstream of the first stage rotor blades is a second stage turbine nozzle 26 conventionally supported to a surrounding annular casing. The combustion gases flow through the second stage nozzle 26 to a row of second stage turbine blades (not illustrated), and further downstream to a low pressure turbine (not shown) which may be used for powering a fan (not shown) in a conventional manner.

Although the first and second stage turbine nozzles 22,26 are configured for channeling the combustion gases to their respective rows of turbine rotor blades, they have substantially different configurations and cooling circuits due to their different placement in the engine. The first stage nozzle 22 first receives the hottest combustion gases from the combustor and requires maximum cooling features which typically include impingement baffles therein for maximizing the cooling effectiveness of the cooling air 16 being bled from the compressor and used as a coolant during operation.

The second stage nozzle 26 receives cooler combustion gases as energy is extracted therefrom and has a simpler cooling configuration typically without use of impingement baffles therein.

In the preferred embodiment illustrated in FIG. 1, the engine 10 itself is relatively small, with the turbine components being correspondingly small, including the second stage nozzle 26. As described above in the Background section, the small size of the second stage nozzle 26 is subject to corresponding problems in efficient cooling thereof and in the economical manufacture of the nozzle components.

Figure 2:
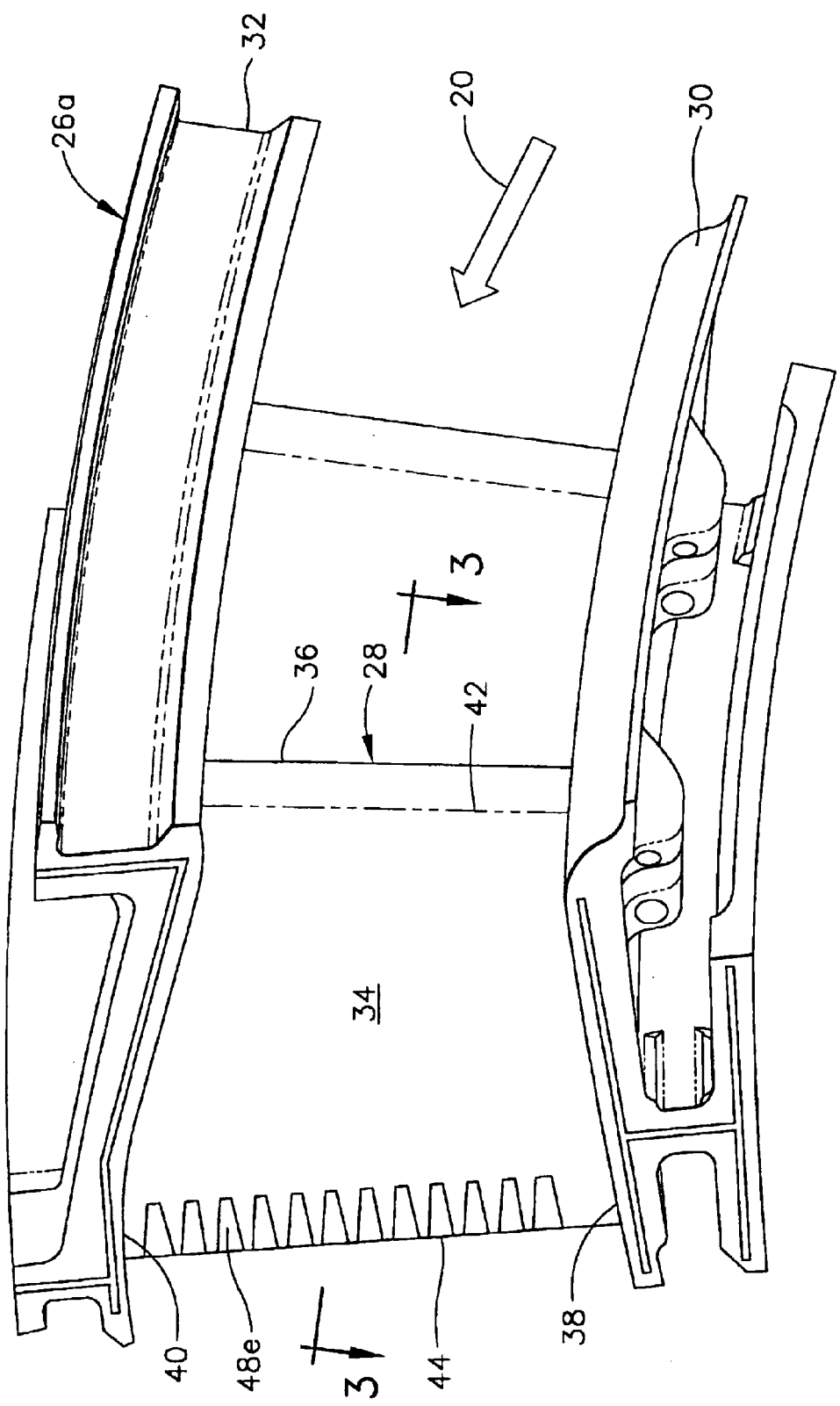
FIG. 2 is an isometric view of the one of the several segments of the nozzle illustrated in FIG. 1.

The second stage nozzle 26 illustrated in FIG. 1 is an annular assembly of components which is axisymmetrical about the centerline axis 12, and is formed by a plurality of arcuate nozzle segments 26a, one of which is illustrated in FIG. 2. Each segment typically includes two vanes or airfoils 28 extending radially outwardly from the centerline axis between a radially inner band 30 and a radially outer band 32 in a unitary, or one-piece construction typically formed by casting.

The turbine nozzle airfoils 28 are substantially identical to each other, with each having first and second sidewalls 34,36 which are circumferentially or laterally opposite from each other. The first, or pressure, sidewall 34 is generally concave, and the second, or suction, sidewall 36 is generally convex. The two sidewalls extend longitudinally or radially in airfoil span between a root at the inner band and an outer tip 40 at the outer band. The two sidewalls extend axially or chordally between a leading edge 42 and a trailing edge 44.

Figure 3:
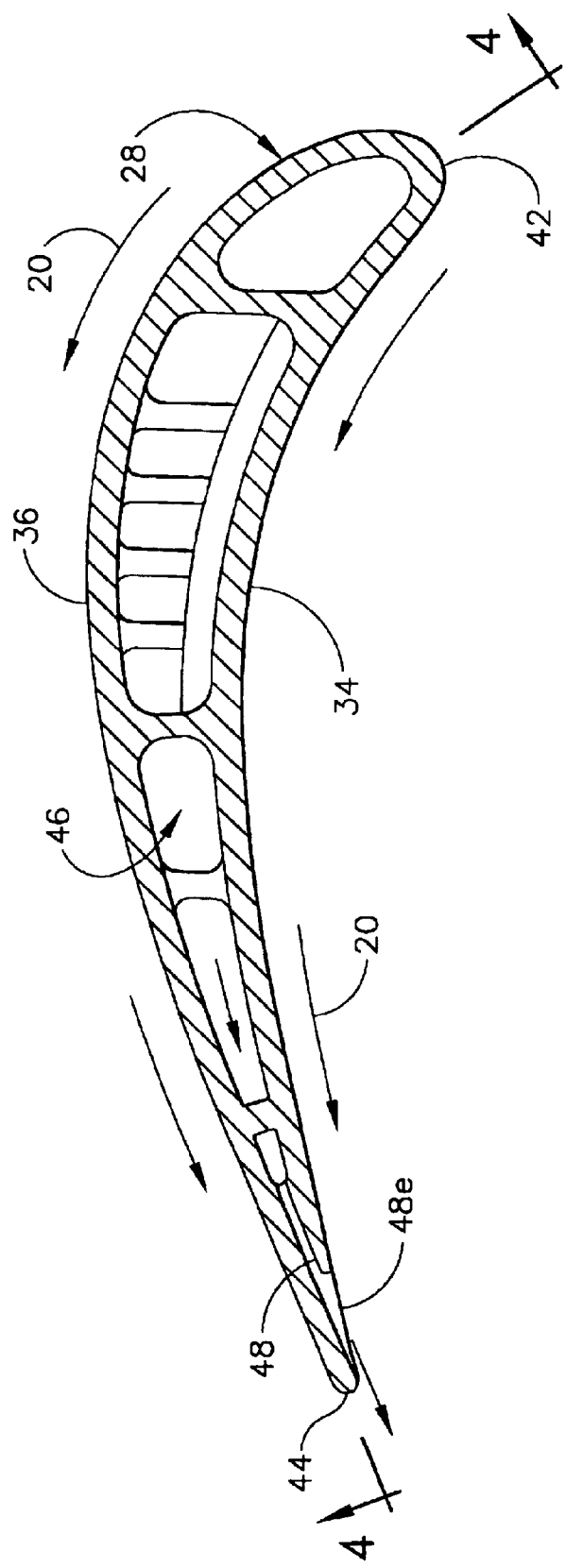
FIG. 3 is a radial sectional view through one of the nozzle airfoil vanes illustrated in FIG. 2 and taken along line 3—3.
Figure 4:
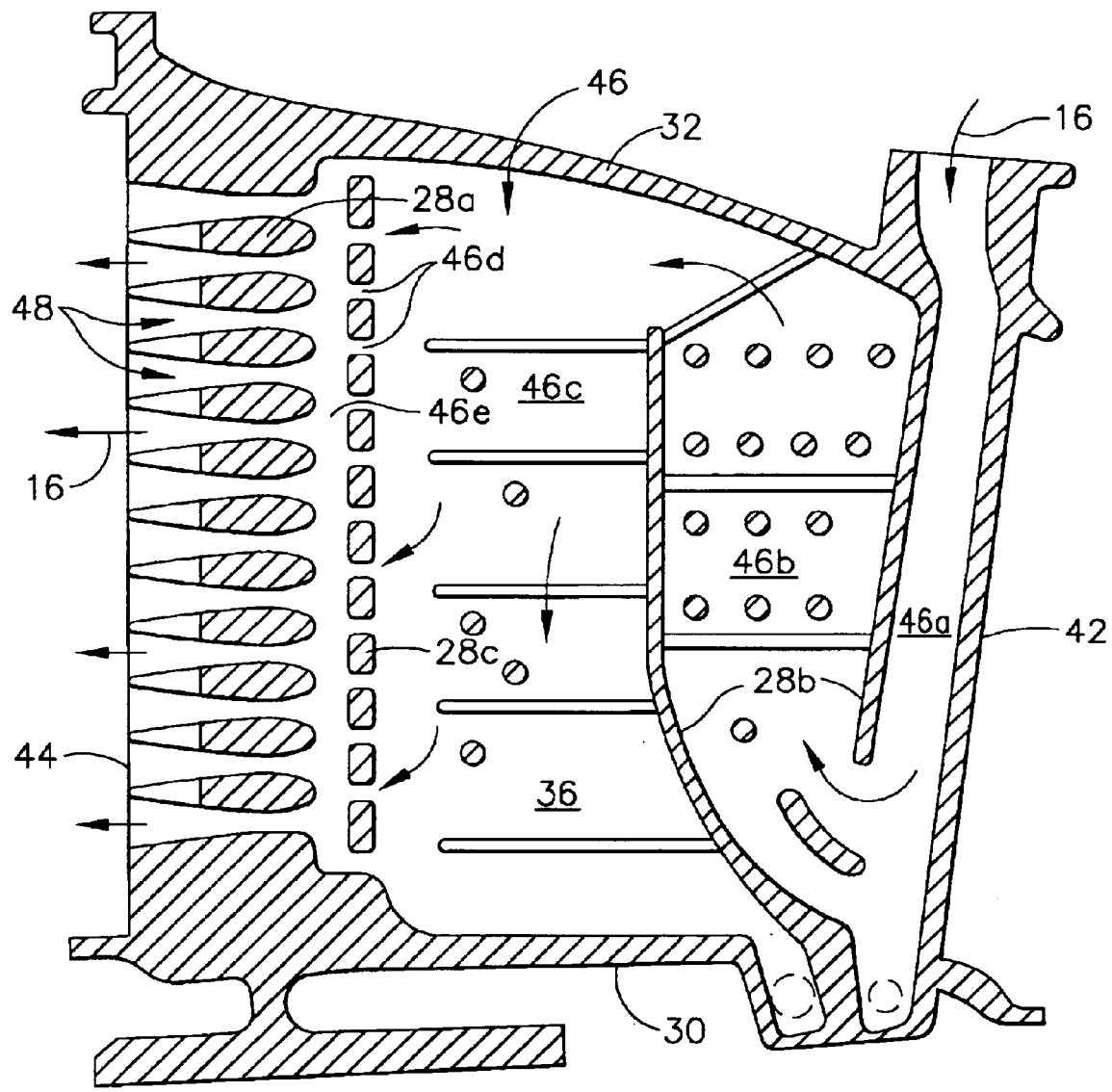
FIG. 4 is an axial sectional view through one of the vanes of the nozzle illustrated in FIG. 3 and taken along line 4—4.

As shown in FIG. 3, the two sidewalls are spaced apart from each other in the typical crescent shape between the leading and trailing edges to define an internal cooling circuit 46 therebetween. In FIG. 4, the pressure sidewall of the airfoil has been removed to illustrate the internal features of the airfoil and the cooling circuit 46 along the inner surface of the suction sidewall 36.

As shown in FIG. 4, a plurality of venturi discharge or outlet slots 48 are arranged in a vertical row along the airfoil span terminating adjacent the trailing edge 44 and commencing inside the airfoil in flow communication with the internal cooling circuit 46 for receiving the cooling air or coolant 16 conventionally provided to the turbine nozzle from the compressor.

Figure 5:
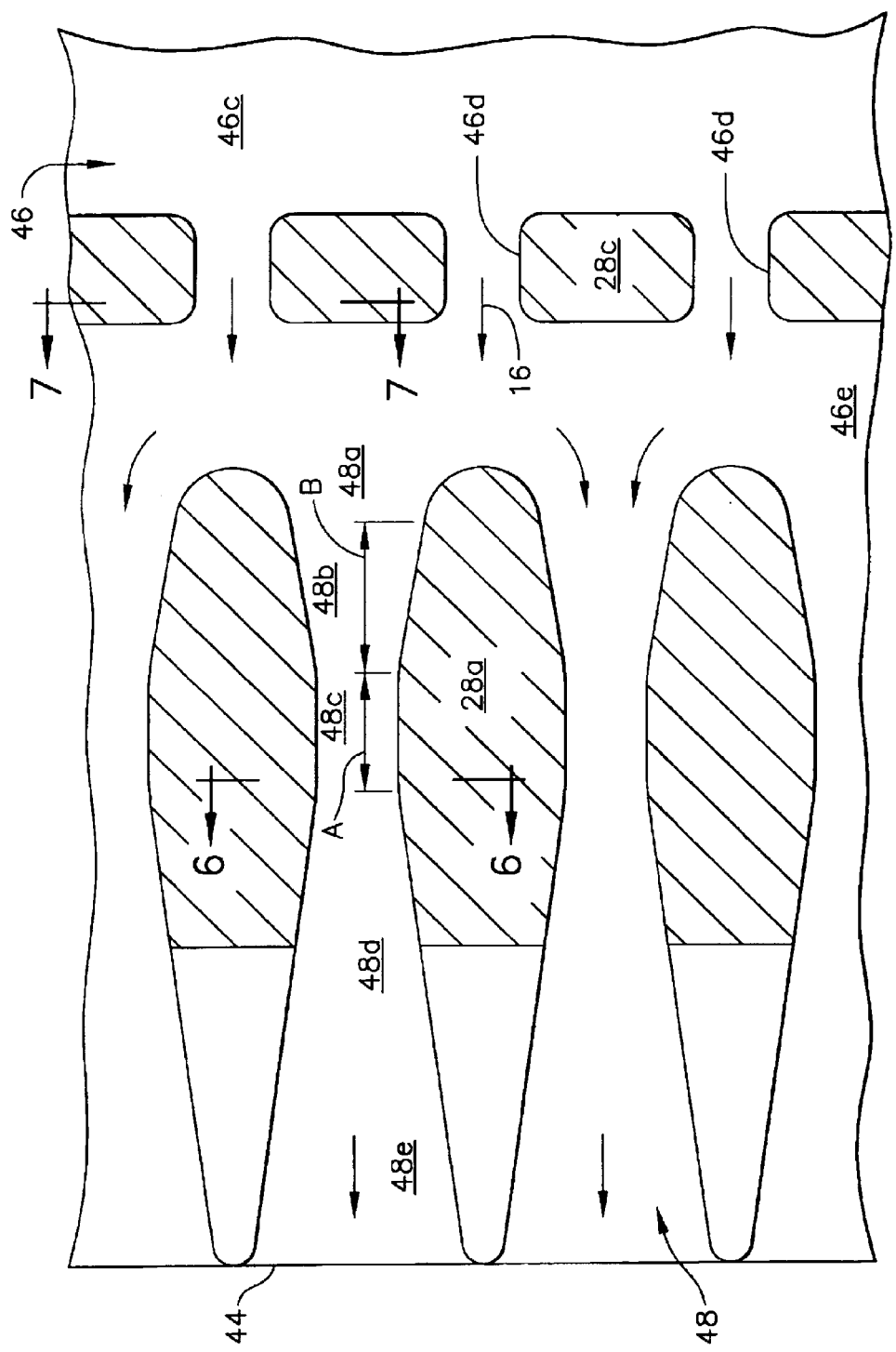
FIG. 5 is an enlarged axial sectional view of exemplary venturi discharge slots in the trailing edge region of the airfoil illustrated in FIG. 4.

FIG. 5 illustrates in greatly enlarged view the preferred form of the venturi slots 48. Each slot is defined in circumferential width between the inner surfaces of the two sidewalls and in radial height between complementary slot bridges 28a which extend circumferentially or laterally between the two sidewalls. Each slot includes in serial flow communication an inlet 48a, a converging portion 48b adjoining the inlet, a throat 48c of minimum flow area adjoining the converging portion, a diverging portion 48d adjoining the throat, and an outlet 48e adjoining the diverging portion and exposed to the vane outside adjacent the trailing edge for discharging the coolant therefrom. The row of slot inlets 48a receive their coolant 16 from the cooling circuit 46 and discharge that coolant axially aft toward the trailing edge for discharge initially upstream therefrom for forming a protective film of cooling air thereat.

Each of the venturi slots illustrated in FIGS. 4 and 5 is precisely configured with discrete and finite length portions from inlet to outlet for advantages in manufacture and performance during operation. The inboard slots between the outer and inner bands may be substantially identical in configuration and size, with the two outboard slots directly adjacent the outer and inner bands being slightly larger in flow area for accommodating their local interaction with the adjacent bands.

As shown in FIG. 5, the slot throat 48c is a finite portion of the overall venturi slot and has an axial or chordal length A selected for suitable control of flow area in the throat and for reproducibility of the throat during casting. The chordal length B of the converging portion 48b is comparable or similar to the chordal length A of the throat for improving durability of the ceramic core. The length B may vary suitably relative to the length A, plus or minus 50% for example, and in one embodiment A is 40 mils and B is 50 mils.

The converging portion of the outlet slots is preferably tapered in the radial span with the width thereof being substantially constant between the pressure and suction sidewalls. The width of the converging portion could also taper if desired.

The converging portion 48b is separate and distinct from the slot inlet 48a, with the inlet being flared in the radial direction with a suitably large radius forming a two-dimensional bellmouth inlet into each venturi slot.

Each venturi slot preferably blends smoothly from the flared inlet 48a continuously to the outlet 48e at its opposite end, with smooth and continuous transitions from portion-to-portion. The corresponding slot bridges 28a are complementarily smooth between their opposite two ends corresponding with the inlet and outlet of the venturi slot. The diverging portion 48d diverges with straight sides along the corresponding bridges 28a, with the upper and lower portions of the slot outlet 48e being aligned straight therewith. As additionally illustrated in FIGS. 2 and 3, the slot outlets 48e terminate forward of the trailing edge itself and are exposed at the pressure sidewall 34, with a generally trapezoid configuration.

The venturi discharge slots 48 offer several advantages in the manufacture and operation of the turbine nozzle airfoils. For example, the flared slot inlet 48a reduces the friction loss at the inlets for improving the flowrate through the slots. The converging, throat, and diverging portions 48b–d provide efficient flow channeling of the coolant with suitable diffusion in the diverging portion 48d for maximizing efficiency of the discharge flow. The diffusion or taper angle of the diverging portion may be about seven degrees, with the converging portion having a similar taper angle, with those taper angles being adjustable for maximizing efficiency in each design.

The distinct portions of the venturi slots permit the production of a relatively long trailing edge discharge slot for minimizing the break-out distance from the trailing edge. Since the airfoil trailing edge is relatively thin, the slot outlet 48e breaks out through the pressure sidewall forward of the trailing edge itself. The coolant is thusly discharged from the airfoil beginning at the break-out distance forward of the trailing edge, which correspondingly reduces the cooling effectiveness of the coolant. The flared slot inlet and converging portion permit the use of a stronger ceramic core, as further described hereinbelow, allowing the venturi slot to be longer than it otherwise would, and thusly minimizing the break-out distance.

In the preferred embodiment illustrated in FIG. 4, the cooling circuit 46 includes a three-pass serpentine channel commencing at a first flow leg 46a extending in span adjacent the airfoil leading edge 42, which is in turn joined to a second or middle flow leg 46b extending in span directly aft of the first leg, and in turn joined to a third or last flow leg 46c extending in span between the middle leg and the row of venturi slots 48.

The multi-pass serpentine circuit is fully contained between the airfoil sidewalls and outer and inner bands and has a single inlet in the outer band atop the leading edge for feeding the coolant radially inwardly through the first leg 46a. The first leg extends to the inner band and then bends upwardly into the middle leg 46b which extends up to the outer band, and then turns downwardly into the last leg 46c which extends down to the inner band.

The serpentine circuit is defined by corresponding circuit bridges 28b extending laterally between the two sidewalls, and in part span between the outer and inner bands to define the three passes or channel legs of the circuit. The serpentine circuit may be otherwise conventionally configured with short-height turbulator ribs and pins, and bridging pins for enhancing heat transfer between the hot metal and the coolant channeled through the airfoil during operation; and with one or more intermediate outlets.

As indicated above, each nozzle segment, and in particular the sidewalls 34,36 defining the individual airfoils is in the preferred form of a unitary, or one-piece casting having the cooling circuit and venturi slots being casting voids therein. The venturi slots 48 extend chordally from the last leg of the serpentine circuit in the casting and enjoy significant advantages in the manufacture thereof by casting as described hereinbelow.

As illustrated in FIGS. 4 and 5, the cooling circuit 46 preferably also includes a plurality of axial crossover holes 46d defined between corresponding bridge pins 28c extending between the opposite airfoil sidewalls. The crossover holes are aligned in a row along the airfoil span and disposed axially or chordally between the venturi slots and the last serpentine leg 46c to define a common discharge channel or manifold 46e. The manifold extends along the airfoil span between the outer and inner bands and adjoins in flow communication all of the slot inlets 48a for discharging the coolant through the respective venturi slots during operation.

A particular advantage of the crossover holes is their ability to introduce an additional pressure drop in the coolant channeled through the airfoils. For a small turbine airfoil where the flow areas of the venturi slots are near practical minimum values, the increase in aerodynamic efficiency of the flared inlet 48a and converging portion 48b can result in an undesirable increase in flowrate of the coolant through the venturi slots. Excessive coolant discharge decreases engine efficiency without providing any additional benefit in trailing edge cooling.

Since it is not feasible or practical to further reduce the flow area of the venturi slots in a small cast turbine airfoil, the row of crossover holes 46d may be introduced for preferentially introducing an additional pressure drop inside the airfoil for metering flow through the cooperating venturi slots. In this way, the crossover holes may introduce a predetermined pressure drop in the coolant for offsetting the otherwise increase in coolant flowrate due to the increased efficiency of the flared slot inlets and converging portions. This configuration additionally permits casting of the venturi slots in a relatively small turbine airfoil, which would otherwise not be possible or practical due to poor ceramic core yield and due to poor airfoil casting yield associated with breakage of the ceramic core during casting.

Figure 7:
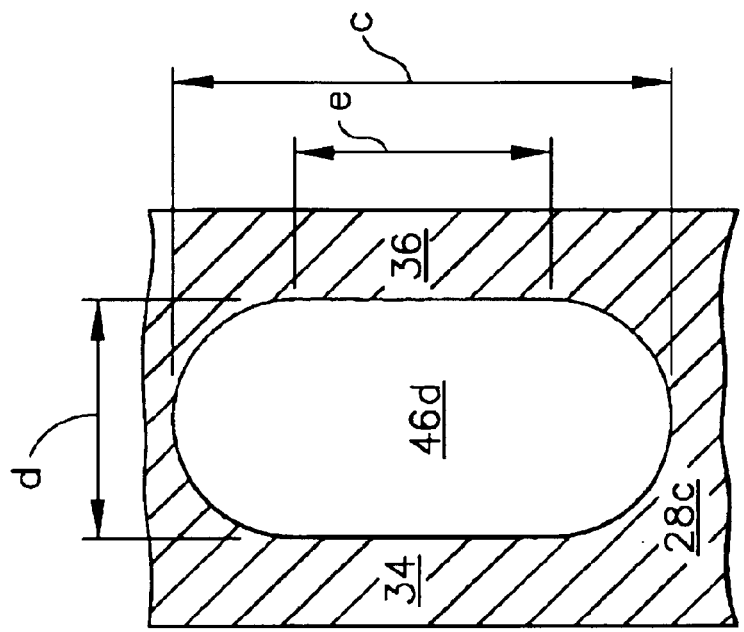
FIG. 7 is a radial sectional view through a crossover hole feeding the venturi slot illustrated in FIG. 5 and taken along line 7—7.
Figure 6:
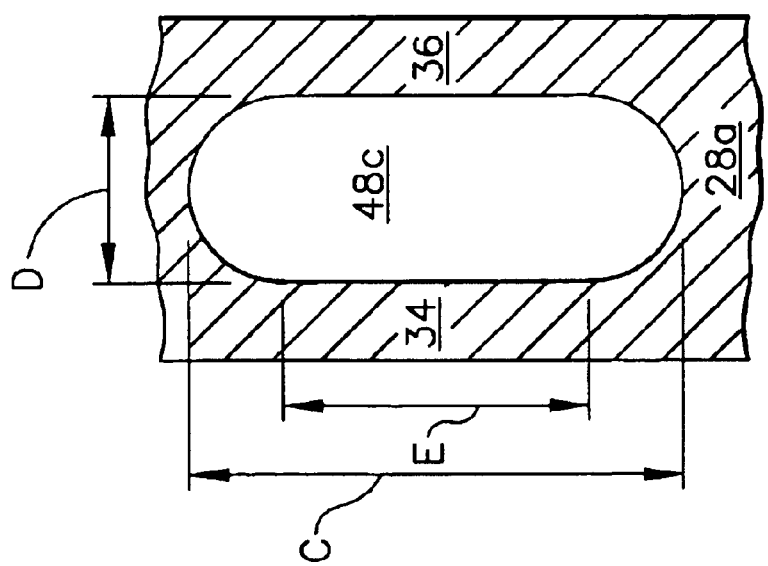
FIG. 6 is a radial sectional view through a slot throat illustrated in FIG. 5 and taken along line 6—6.

Ceramic core strength may be further increased by introducing generally rectangular or oval cross sections for the venturi slots 48 and crossover holes 46d as illustrated in FIGS. 6 and 7. In particular, the flow area of the throat 48c controls the flowrate of the coolant through the venturi slot. The throat has a height C in the airfoil span direction, and a width D in the circumferential direction between the two sidewalls, with the four sides of the throat defining a oval with substantially straight sides and full fillets at the top and bottom thereof. The height E of the straight portions of the span sides of the throat is suitably smaller than the height C between the top and bottom fillet sides. The flow area of the rectangular throat may be conventionally calculated using the dimensions C,D.

Similarly, each of the crossover holes 46d has an oval cross section with a span height c and a lateral width d, with a span height e of the straight portions of the span sides being smaller than the height c by the corresponding full fillets at the top and bottom sides of the hole.

The oval configurations of the crossover holes 46d and the venturi throats 48c are similar with their corresponding span heights C,c being greater than their lateral widths D,d which increases the strength of the ceramic core in these regions due to the increased bending moment of inertia in the span direction.

In the preferred embodiment illustrated in FIG. 4 for a second stage turbine nozzle configuration, there are twelve venturi slots 48a uniformly spaced along the trailing edge of the airfoil cooperating with thirteen crossover holes 46d, with each slot inlet 48a as illustrated in FIG. 5 being aligned radially with a corresponding bridge pin 28c. Correspondingly, each slot bridge 28a is aligned radially in span with a corresponding crossover hole 46d. This improves cooling effectiveness at the trailing edge by impingement cooling the slot bridges 28a, while increasing the desired pressure drop in this region. And, the interconnection of the oval venturi slots and crossover holes improves the strength of the ceramic core for increasing yield thereof.

The collective flow area of the crossover holes 46d in the entire row thereof is preferably substantially greater than the collective flow area of the throats 48c of all the venturi slots for maintaining sufficient backflow margin and a suitable pressure drop along the airfoil trailing edge region. Backflow margin is a conventional term of art representing the differential pressure available between the coolant and combustion gases on opposite sides of the airfoil wall.

Sufficient backflow margin is required to prevent ingestion of the hot combustion gases into the turbine airfoils during operation. The combination of the venturi slots and cooperating crossover holes has many advantages as explained above including the introduction of a suitable backflow margin with a preferential pressure drop in the coolant as it is discharged from the serpentine cooling circuit.

In a preferred embodiment, the crossover holes 46d and the venturi throats 48c have a corresponding flow area ratio of about 4/3, with the collective area of the former holes being greater than the collective area of the latter throats. This unique area ratio enhances backflow margin and pressure drop of the coolant being discharged.

More specifically, the crossover holes and the venturi throats may be sized in flow area to effect corresponding pressure drops of about 15 percent and about 75 percent, respectively, of the total pressure drop of the coolant through the airfoil. In the exemplary configuration illustrated in FIG. 4, this may be effected by the 4/3 area ratio between the row of holes and venturi throats.

As illustrated in FIG. 3, the pressure sidewall 34 of the airfoil is generally concave and cooperates with the suction sidewall of an adjacent airfoil to effect a pressure drop in the combustion gases 20 flowable thereover during operation. The crossover holes and the venturi throats are sized in flow area as described above to additionally effect a collective, or total pressure drop thereacross of about 90 percent, for substantially matching the pressure drop in the combustion gases 20 as they flow outside the pressure sidewall along the region of the crossover holes and venturi slots.

In this way, in the event of cracking of the airfoil in the trailing edge region at the end of the life of the airfoil, the internal pressure drop of the coolant in the trailing edge region will generally match the external pressure drop of the combustion gases for maintaining a suitable backflow margin at the site of any crack in this region. The so-cracked airfoil may then be operated without additionally adverse effect until the next available maintenance outage.

As indicated above, for particularly small turbine airfoils it is desired to cast the entire internal cooling features, including the trailing edge discharge slots, if practical. The venturi configuration of the discharge slot includes several features for improving the yield of the ceramic core and airfoil casting. In particular, the slot converging portion 48b increases in size toward the flared slot inlet 48a, and that inlet additionally increases in size to the manifold 46e. The corresponding ceramic core in this region will therefore be larger than it otherwise would be and has improved strength for increasing yield.

Furthermore, the crossover holes 46d and venturi throats 48c have the tall oval configurations described above with a height-to-width ratio C/D or c/d preferably greater than two. For example, the c/d ratio may be about 2.2, and the C/D ratio may be about 2.8.

Figure 8:
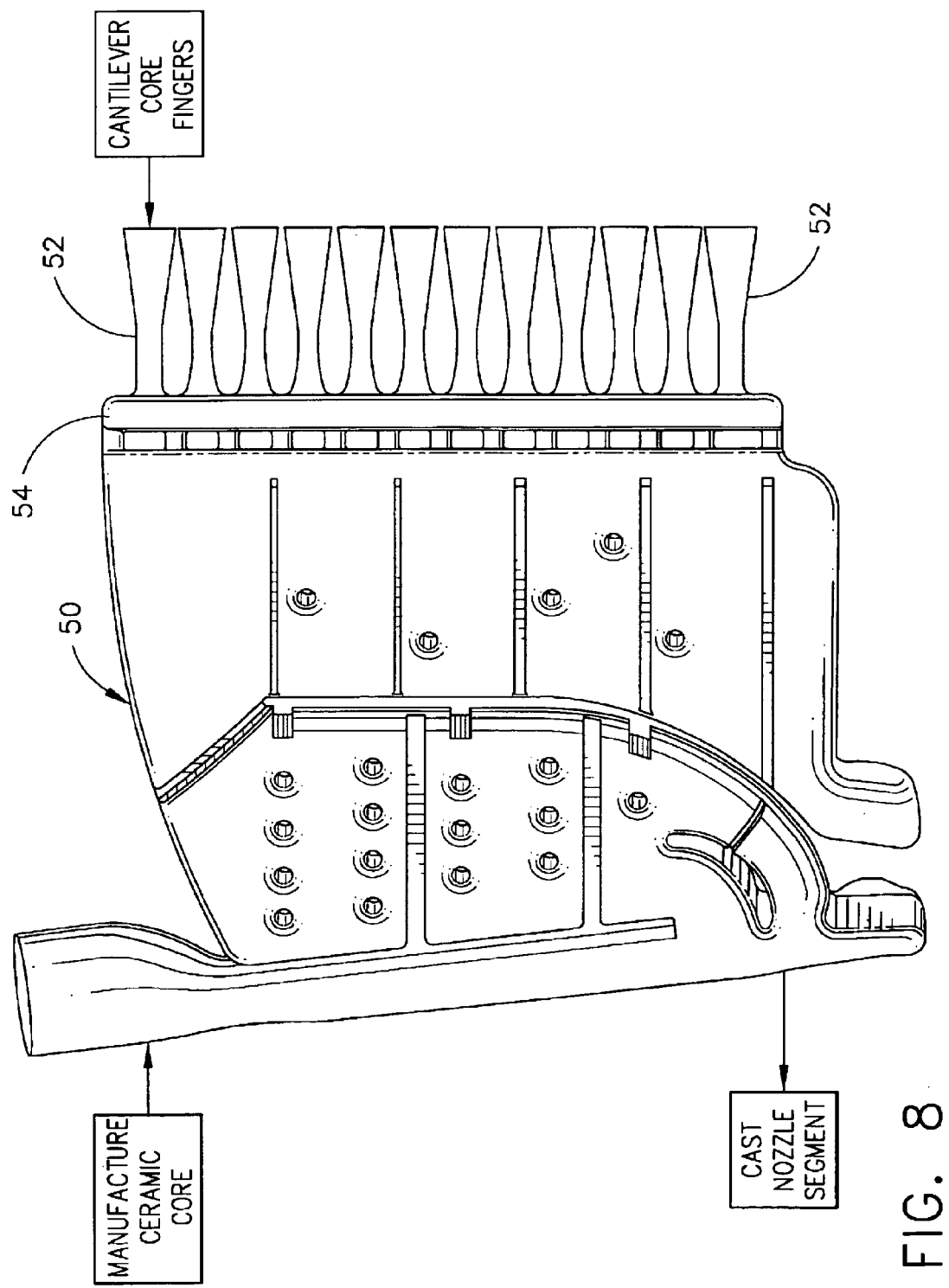
FIG. 8 is a flowchart of an exemplary method of making the turbine airfoil illustrated in FIGS. 1–7.

FIG. 8 illustrates schematically a preferred method of making one of the turbine nozzle airfoils previously illustrated in FIGS. 1–7. A ceramic core 50 is configured to correspond with the internal cooling circuit 46 and cooperating venturi slots 48 as illustrated, for example, in FIG. 4. The ceramic core material is solid and when used in the casting process is surrounded by molten metal which solidifies to form the metal portions of the airfoil including the thin sidewalls 34,36 between which the ceramic core is captured. Upon removal of the ceramic core from the casting, a corresponding void is created which matches the intended configurations of the cooling circuit and venturi slots.

The manufacture of ceramic cores and the casting of nozzle segments and their airfoils is conventional. The nozzle segments are typically cast with two airfoils per segment in an integral unitary assembly with the outer and inner bands.

The ceramic core 50 illustrated in FIG. 8 is specifically configured in one embodiment of the present invention to include a row of axially extending core fingers 52 configured for corresponding with the venturi slots 48 of FIG. 4 for example. The row of core fingers 52 is cantilevered from a common core leg 54 which corresponds with the discharge manifold 46e of FIG. 4. The remainder of the core 50 is conventionally configured for defining the three-pass serpentine cooling circuit 46a,b,c also illustrated in FIG. 4.

FIG. 8 illustrates that the core fingers are relatively long and individually supported or cantilevered integrally from the common core leg 54. The core fingers and leg are solid ceramic material which corresponds with the voids in FIGS. 5 and 6 which define the complementary features of the venturi slots and their flow communication with the common manifold 46e.

The converging cross sections of the flared inlet 40a and adjoining converging portion 48b of each venturi slot provide increased bending moment of inertia or strength for each of the ceramic core fingers 52 where they join the common core leg 54. The strength of the fingers is correspondingly increased for increasing the yield of the ceramic cores for making economical the casting of these features in the resulting turbine airfoil.

The introduction of the specifically configured venturi discharge slots 48 and their cooperation with the crossover holes 46d has various advantages as described above in both aerodynamic performance for efficiency, and in manufacturing using conventional casting processes. These advantages are particularly useful in relatively small turbine airfoils, such as those found in turbine nozzle vanes, but could also be used in larger turbine airfoils, as well as in turbine rotor blades where desired.

The three-pass serpentine cooling circuit illustrated in FIG. 4 is fully contained within the inner and outer bands and does not require brazed cover plates on the inner or outer bands as might be found in other casting configurations. The three serpentine legs channel their cooling flow in series to feed the common row of crossover holes 46d which in turn feed the common manifold 46e for feeding the row of venturi discharge slots 48.

The corresponding ceramic core 50 illustrated in FIG. 8 is relatively strong, including the cantilevered core fingers 52 not otherwise interconnected except at the common core leg 54, which may have a high ceramic core yield for economically casting a large number of nozzle vane airfoils required for a particular engine application.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A gas turbine engine airfoil comprising:
   pressure and suction sidewalls extending longitudinally in airfoil span between a root and a tip, and chordally between opposite leading and trailing edges, and spaced laterally apart therebetween to define an internal cooling circuit;
   a plurality of venturi slots terminating adjacent said trailing edge and commencing inside said airfoil in flow communication with said cooling circuit;
   each of said venturi slots including in serial flow communication a flared inlet, a converging portion adjoining said inlet, a throat of minimum flow area adjoining said converging portion, a diverging portion adjoining said throat, and an outlet adjoining said diverging portion and exposed adjacent said trailing edge for discharging said coolant; and
   said slot converging portion being comparable in chordal length to said throat and tapering in radial span substantially linearly from said flared inlet to said throat.

2. An airfoil according to claim 1 wherein each of said venturi slots blends smoothly from said flared inlet to said outlet.

3. An airfoil according to claim 2 wherein:
   said cooling circuit comprises a three-pass serpentine channel commencing at a first leg adjacent said leading edge and terminating at a last leg adjoining said venturi slots; and
   said venturi slots extend chordally from said last leg.

4. An airfoil according to claim 3 wherein said cooling circuit further comprises a plurality of crossover holes aligned in a row along said airfoil span, and disposed chordally between said venturi slots and said last serpentine leg to define a discharge manifold adjoining said slot inlets for discharging said coolant through said venturi slots.

5. An airfoil according to claim 4 wherein:
   said venturi slots and crossover holes have oval cross sections greater in height along said airfoil span than in width between said sidewalls; and
   said crossover holes have a collective flow area greater than a collective flow area of said throats of said venturi slots.

6. An airfoil according to claim 5 wherein:
   said sidewalls comprise a casting, with said cooling circuit and venturi slots being casting voids therein;
   said slot outlets terminate forward of said trailing edge, and are exposed at said pressure sidewall; and
   said pressure sidewall is generally concave to effect a pressure drop in combustion gases flowable thereover.

7. An airfoil according to claim 6 wherein said crossover holes and slot throats have a corresponding area ratio of about 4/3.

8. An airfoil according to claim 7 wherein said crossover holes and slot throats have height-to-width ratios greater than about two.

9. An airfoil according to claim 6 wherein said crossover hole and said slot throats are sized in flow area to effect corresponding pressure drops of about 15 percent and about 75 percent, respectively, of the total pressure drop of said coolant through said airfoil.

10. An airfoil according to claim 6 further comprising an inner band integrally joined to said airfoil root, and an outer band integrally joined to said airfoil tip; and
    said crossover holes and said slot throats are sized in flow area to effect a collective pressure drop thereacross substantially matching pressure drop in said combustion gases flowable outside said pressure sidewall along said crossover holes and venturi slots.

11. A gas turbine engine airfoil comprising:
    first and second sidewalls extending longitudinally in airfoil span between a root and a tip, and chordally between opposite leading and trailing edges, and spaced laterally apart therebetween to define an internal cooling circuit;
    a plurality of venturi slots terminating adjacent said trailing edge and commencing inside said airfoil in flow communication with said cooling circuit;
    each of said venturi slots including in serial flow communication an inlet, a converging portion adjoining said inlet, a throat of minimum flow area adjoining said converging portion, a diverging portion adjoining said throat, and an outlet adjoining said diverging portion and exposed adjacent said trailing edge for discharging said coolant; and
    said slot converging portion being comparable in chordal length to said throat and tapering in radial span substantially linearly from said flared inlet to said throat.

12. An airfoil according to claim 11 wherein said slot inlet is flared and blends smoothly with said slot converging portion.

13. An airfoil according to claim 12 wherein said cooling circuit further comprises a plurality of crossover holes aligned in a row along said airfoil span, and disposed chordally between said venturi slots and said leading edge to define a discharge manifold adjoining said slot inlets for discharging said coolant through said venturi slots.

14. An airfoil according to claim 13 wherein:

said cooling circuit further comprises a multi-pass serpentine channel commencing at a first leg adjacent said leading edge and terminating at a last leg adjoining said crossover holes;

said sidewalls comprise a casting, with said cooling circuit and venturi slots being casting voids therein; and said venturi slots extend chordally from said last leg.

15. An airfoil according to claim 14 wherein:

said venturi slots and crossover holes have oval cross sections greater in height along said airfoil span than in width between said sidewalls; and said crossover holes have a collective flow area greater than a collective flow area of said throats of said venturi slots.

16. An airfoil according to claim 15 wherein said crossover holes and slot throats have a corresponding area ratio of about 4/3.

17. An airfoil according to claim 15 wherein said crossover holes and slot throats have height-to-width ratios greater than about two.

18. An airfoil according to claim 15 wherein said crossover holes and said slot throats are sized in flow area to effect corresponding pressure drops of about 15 percent and about 75 percent, respectively, of the total pressure drop of said coolant through said airfoil.

19. An airfoil according to claim 15 wherein:

said slot outlets terminate forward of said trailing edge, and are exposed at said first sidewall;

said first sidewall is generally concave to define a pressure sidewall to effect a pressure drop in combustion gases flowable thereover; and said crossover holes and said slot throats are sized in flow area to effect a collective pressure drop thereacross substantially matching pressure drop in said combustion gases flowable outside said first sidewall along said crossover holes and venturi slots.

20. A method of making said airfoil according to claim 15 comprising:

manufacturing a ceramic core corresponding with said cooling circuit and venturi slots, with core fingers for said slots being cantilevered from a common core leg for said discharge manifold; and casting said airfoil using said core to form said cooling circuit and venturi slots between said first and second sidewalls.

* * * * *